(12) United States Patent
Schreter

(10) Patent No.: US 10,552,069 B2
(45) Date of Patent: Feb. 4, 2020

(54) CACHING THE TOPOLOGY OF A DISTRIBUTED DATA STORAGE SYSTEM

(71) Applicant: SAP SE, Walldorf (DE)

(72) Inventor: Ivan Schreter, Malsch (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 16/029,454

(22) Filed: Jul. 6, 2018

(65) Prior Publication Data

US 2019/0012105 A1 Jan. 10, 2019

Related U.S. Application Data

(60) Provisional application No. 62/530,075, filed on Jul. 7, 2017.

(51) Int. Cl.
*G06F 3/00* (2006.01)
*G06F 3/06* (2006.01)
(Continued)

(52) U.S. Cl.
CPC .......... *G06F 3/0631* (2013.01); *G06F 3/0604* (2013.01); *G06F 3/064* (2013.01); *G06F 3/067* (2013.01); *G06F 3/0608* (2013.01); *G06F 3/0611* (2013.01); *G06F 3/0644* (2013.01); *G06F 3/0652* (2013.01);
(Continued)

(58) Field of Classification Search
CPC .............. G06F 3/0631; G06F 11/1446; G06F 11/1471; G06F 11/1658; G06F 16/162; G06F 12/1009; G06F 12/0802; G06F 16/27; G06F 3/0644; G06F 16/951; G06F 3/0611; G06F 16/245; G06F 16/215; G06F 16/1824; G06F 3/0652; G06F 16/2358; G06F 16/134; G06F 3/0659; G06F 16/176; G06F 3/0608; G06F 16/24552; G06F 3/064; G06F 3/0673; G06F 16/128; G06F 3/067; G06F 3/0604; G06F 2201/84; G06F 2212/604; G06F 2212/652; G06F 2201/85;
(Continued)

(56) References Cited

U.S. PATENT DOCUMENTS 5,878,431 A * 3/1999 Potterveld .............. G06F 9/465
707/694
7,849,223 B2 * 12/2010 Malkhi ................... H04L 67/34
709/248

(Continued)

*Primary Examiner* — Hong C Kim
(74) *Attorney, Agent, or Firm* — Mintz Levin Cohn Ferris Glovsky and Popeo, P.C.

(57) ABSTRACT

A method can include caching, at a first computing node and a second computing node, a replica of an anchor object. The anchor object can link to a topology object storing elements comprising a distributed data storage system. The first computing node can reside in a first availability zone. The second computing node can reside in a second availability zone. The first availability zone and the second availability zone can be part of a data center. The first computing node and the second computing node can each store a data partition associated with a data container belonging to a tenant. A replica of the topology object can be cached at the first availability zone and the second availability zone. A query requiring data associated with the tenant can be executed based on the cached replica of the anchor objects and/or topology objects.

20 Claims, 10 Drawing Sheets

(51) Int. Cl.

| | | |
|---|---|---|
| *G06F 17/30* | (2006.01) | |
| *G06F 16/11* | (2019.01) | |
| *G06F 16/2455* | (2019.01) | |
| *G06F 12/0802* | (2016.01) | |
| *G06F 16/16* | (2019.01) | |
| *G06F 16/182* | (2019.01) | |
| *G06F 16/176* | (2019.01) | |
| *G06F 16/13* | (2019.01) | |
| *G06F 12/1009* | (2016.01) | |
| *G06F 16/951* | (2019.01) | |
| *H04L 29/08* | (2006.01) | |
| *G06F 16/27* | (2019.01) | |
| *G06F 16/23* | (2019.01) | |
| *G06F 11/16* | (2006.01) | |
| *G06F 16/245* | (2019.01) | |
| *G06F 16/215* | (2019.01) | |

(52) U.S. Cl.
CPC .......... *G06F 3/0659* (2013.01); *G06F 3/0673* (2013.01); *G06F 11/1658* (2013.01); *G06F 12/0802* (2013.01); *G06F 12/1009* (2013.01); *G06F 16/128* (2019.01); *G06F 16/134* (2019.01); *G06F 16/162* (2019.01); *G06F 16/176* (2019.01); *G06F 16/1824* (2019.01); *G06F 16/215* (2019.01); *G06F 16/2358* (2019.01); *G06F 16/245* (2019.01); *G06F 16/24552* (2019.01); *G06F 16/27* (2019.01); *G06F 16/951* (2019.01); *G06F 17/30088* (2013.01); *H04L 67/1097* (2013.01); *H04L 67/2809* (2013.01); *G06F 2201/85* (2013.01); *G06F 2212/604* (2013.01); *G06F 2212/652* (2013.01)

(58) Field of Classification Search
CPC . H04L 69/40; H04L 67/2842; H04L 67/2809; H04L 67/1097
USPC ................ 707/755, 758, 796; 709/217, 213; 711/170, 118; 714/2
See application file for complete search history.

(56) References Cited

U.S. PATENT DOCUMENTS

| | | | |
|---|---|---|---|
| 2006/0271705 A1* | 11/2006 | Garcia-Luna-Aceves | .................. G06F 12/1483 709/242 |
| 2009/0150566 A1* | 6/2009 | Malkhi | ................... H04L 67/34 709/242 |
| 2010/0293140 A1* | 11/2010 | Nishiyama | ............... G06F 16/27 707/636 |
| 2014/0059290 A1* | 2/2014 | Ross | ................... H04L 67/1097 711/112 |
| 2014/0289358 A1* | 9/2014 | Lindamood | ......... G06F 11/2094 709/214 |
| 2016/0026672 A1* | 1/2016 | Zhang | .................... G06F 16/13 707/686 |
| 2016/0105471 A1* | 4/2016 | Nunes | ................. H04L 12/4633 709/228 |
| 2016/0308968 A1* | 10/2016 | Friedman | ............ H04L 67/2842 |
| 2017/0134276 A1* | 5/2017 | White | ................... H04L 45/742 |
| 2017/0295061 A1* | 10/2017 | Wittenschlaeger | ....... G06F 9/54 |

* cited by examiner

CACHING THE TOPOLOGY OF A DISTRIBUTED DATA STORAGE SYSTEM

RELATED APPLICATION

This application claims priority to U.S. Provisional Application No. 62/530,075 entitled MULTI-CLOUD TOPOLOGY AND CONTAINER METADATA MANAGEMENT and filed on Jul. 7, 2017, the disclosure of which is incorporated herein by reference in its entirety.

TECHNICAL FIELD

The subject matter described herein relates generally to distributed computing and more specifically to topology management within a distributed data storage system.

BACKGROUND

A distributed data storage system can store data across multiple computing nodes. These computing nodes can be located across different racks, availability zones, and/or data centers in the distributed data storage system. Furthermore, the distributed data storage system can be configured to store data from multiple tenants. Data from each individual tenant can be organized into one or more data partitions and stored in at least one data container. Moreover, each data partition can be stored in one of the computing nodes in the distributed data storage system. As such, locating data within the distributed data storage system, for example, in order to execute a query (e.g., a structured query language (SQL) statement and/or the like), can require identifying the data partition and/or the data container holding the data. Alternatively and/or additionally, locating data within the distributed data storage system can require identifying the data center, availability zone, rack, and/or computing node storing the data.

SUMMARY

Systems, methods, and articles of manufacture, including computer program products, are provided for managing the topology of a distributed data storage system. In one aspect, there is provided a system. The system may include at least one data processor and at least one memory. The at least one memory may store instructions that result in operations when executed by the at least one data processor. The operations may include: caching, at each of a first computing node and a second computing node, a replica of an anchor object, the anchor object linking to a topology object storing a plurality of elements comprising a topology of the distributed data storage system, the first computing node residing in a first availability zone, the second computing node residing in a second availability zone, the first availability zone and the second availability zone comprising at least a first data center, the first computing node and the second computing node each storing a data partition associated with at least one data container belonging to a first tenant of the distributed data storage system; caching, at each of the first availability zone and the second availability zone, at least one replica of the topology object; and executing a query requiring data associated with the first tenant, the execution of the query comprising by at least identifying, based at least on a cached replica of the anchor object and/or the topology object, the first computing node and/or the second computing node as having the data required by the query.

In some variations, one or more features disclosed herein including the following features can optionally be included in any feasible combination. The first availability zone can be part of the first data center and the second availability zone can be part of a second data center. At least one replica of a first availability object corresponding to the first availability zone can be cached at a first rack and a second rack comprising the first availability zone. The first availability zone object can store a first identifier of the first data center and a second identifier of the first availability zone.

In some variations, at least one replica of a home object corresponding to a home of the first tenant can be cached at the first data center, the second data center, the first availability zone, and/or the second availability zone. The home of the first tenant can be defined based at least on a placement of the data associated with the first tenant across the distributed data storage system.

In some variations, a container object corresponding to the data container and a partition map object corresponding to a partition map associated with the data container can be cached at each of the first computing node and the second computing node. The partition map can include a plurality of entries corresponding to a plurality of data partitions included in the data container. Executing the query can include identifying, based at least on the container object and the partition map object, a partition map entry object corresponding to one of the plurality of data partition holding the data required by the query. Each of the plurality of entries can include a key and a partition identifier associated with one of the plurality of data partitions included in the data container.

In some variations, the execution of the query can further include locating the container object based at least on an identifier of the first tenant and an identifier of the data container. The container object can be located by at least traversing the topology of the distributed data storage system. The traversal of the topology of the distributed data storage system can include traversing from the anchor object to the topology object and to the home object in order to reach the container object.

In some variations, the execution of the query can further include locating a partition object corresponding to the one of the plurality of data partitions holding the data required by the query. The partition object can be located by further traversing the topology of the distributed data storage system from the container object to the partition map object and to the partition map entry object corresponding to one of the plurality of entries included in the partition map. The partition map entry object can link to the partition object. The partition object can be located based at least on a key and a partition identifier associated with the one of the plurality of data partitions.

In some variations, the plurality of elements can include the home of the first tenant, the first tenant, the first availability zone, the second availability zone, the first data center, the data container, the partition map, the plurality of entries, and/or the plurality of data partitions.

In some variations, the topology object can include data shared by the first tenant and a second tenant in the distributed data storage system. The topology object can be stored in a system data partition and/or a system data container that is associated with a system tenant instead of the first tenant or the second tenant.

In some variations, in response to a failure at a third computing node in the distributed data storage system, the topology of the distributed data storage system can be reconstructed by at least traversing the first computing node in the first availability zone and/or the second computing node in the second availability zone to retrieve the replica of the anchor object and/or the at least one replica of the topology object.

Implementations of the current subject matter can include, but are not limited to, methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a non-transitory computer-readable or machine-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including, for example, to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to web application user interfaces, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

In a distributed data storage system, data from different tenants can be organized into one or more data containers, each of which holds at least one data partition from a tenant. Meanwhile, each data partition can be stored in one of a plurality of computing nodes located across different racks, availability zones, and/or data centers in the distributed data storage system. Accordingly, locating data within the distributed data storage system may require metadata corresponding to the topology of the distributed data storage system. For example, the topology of the distributed data storage system can include the data containers and data partitions included in the distributed data storage system. Alternatively and/or additionally, the topology of the distributed data storage system can include the data centers, availability zones, racks, and/or computing nodes.

In some implementations of the current subject matter, the topology of a distributed data storage system can be stored, for example, as metadata. But storing the topology of the distributed data storage system at a single location within the distributed data storage system (e.g., one data center and/or availability zone) can give rise to a single point of failure. That is, an isolated failure at that location can trigger a full shutdown of the entire distributed data storage system including portions of the distributed data storage system that are unaffected by the failure. As such, according to some implementations of the current subject matter, the topology of a distributed data storage system can be replicated across the distributed data storage system. For instance, at least a portion of the metadata corresponding to the topology of the distributed data storage system can be replicated and cached at computing nodes located across different data centers, availability zones, and/or racks within the distributed data storage system. The replica of the topology that is cached at the unaffected portions of the distributed data storage system can enable these portions of the distributed data storage system to remain fully operational in the event of an isolated failure.

Figure 1A:
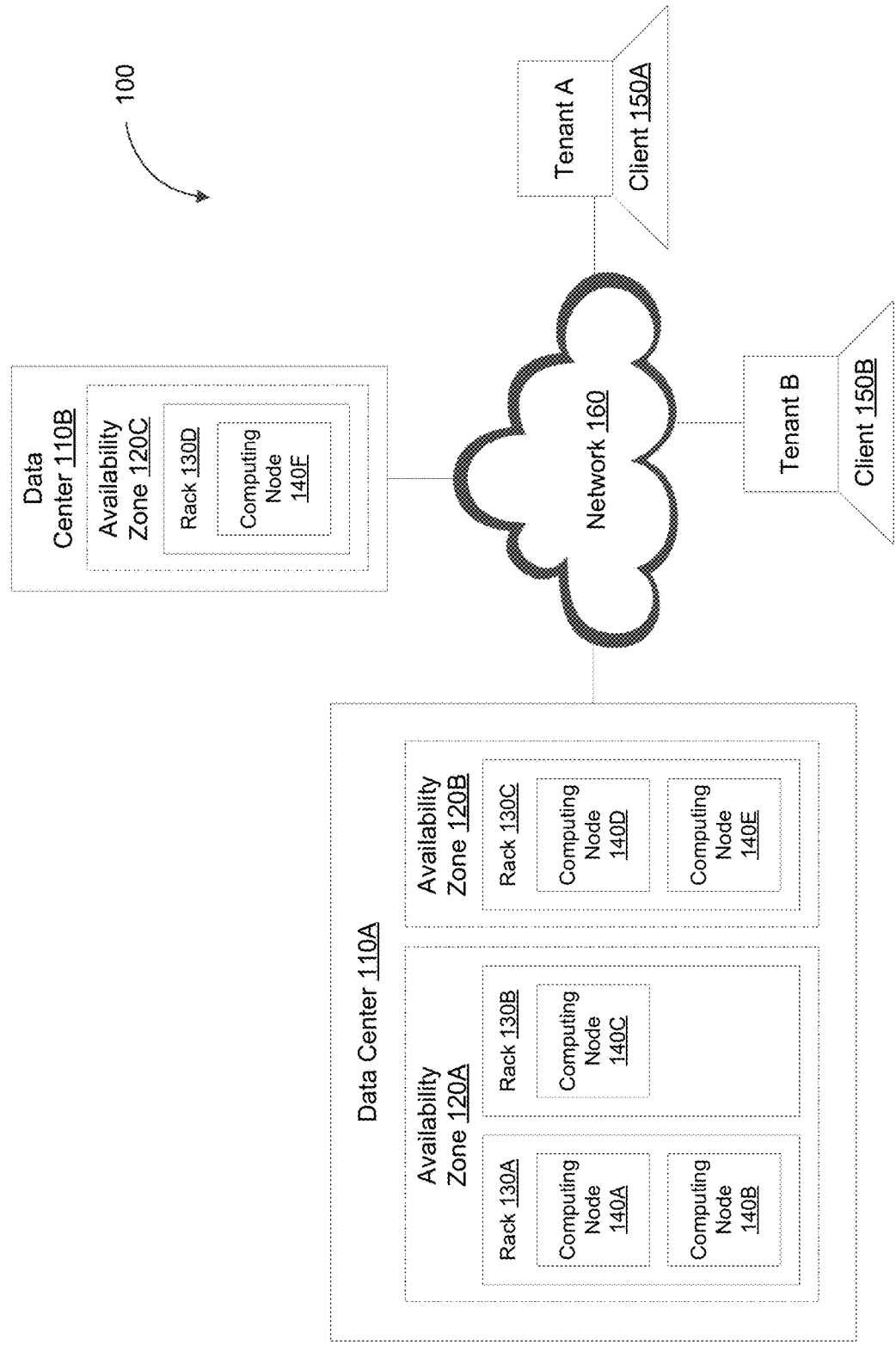
FIG. 1A depicts a system diagram illustrating a distributed data storage system consistent with some implementations of the current subject matter.

FIG. 1A depicts a system diagram illustrating a distributed data storage system 100 consistent with implementations of the current subject matter. Referring to FIG. 1A, the distributed data storage system 100 can include one or more data centers including, for example, a first data center 110A and a second data center 110B. Each data center can include one or more availability zones. As used herein, an availability zone can refer to an independent and isolated portion of a data center that does not share resources with other availability zones including, for example, power, network connectivity, and/or the like. However, it should be appreciated that two or more availability zones within the same data center may be connected via low latency links.

To further illustrate, FIG. 1A shows the first data center 110A as having a first availability zone 120A and a second availability zone 120B. Furthermore, each availability zone can include one or more computing nodes, which may be placed on the same and/or different racks. For instance, as shown in FIG. 1A, the first availability zone 120A may include a first computing node 140A, a second computing node 140B, and a third computing node 140C. Both the first computing node 140A and the second computing node 140B may be placed on a first rack 130A while the third computing node 140C may be placed on a second rack 130B. Meanwhile, the second availability zone 120B can include a third rack 130C, which may hold a fourth computing node 140D and a fifth computing node 140E. Alternatively and/or additionally, the second data center 110B can include a third availability zone 120C. The third availability zone 120C can include a fourth rack 130D holding a sixth computing node 140F.

In some implementations of the current subject matter, the topology of the distributed data storage system 100 can include objects corresponding to the first data center 110A, the second data center 110B, the first availability zone 120A, the second availability zone 120B, the third availability zone 120C, the first rack 130A, the second rack 130B, the third rack 130C, the fourth rack 130D, the first computing node 140A, the second computing node 140B, the third computing node 140C, the fourth computing node 140D, the fifth computing node 140E, and/or the sixth computing node 140F.

In some implementations of the current subject matter, the distributed data storage system 100 can be configured to store data associated with multiple tenants including, for example, Tenant A and Tenant B. Data from each tenant of the distributed data storage system 100 (e.g., Tenant A and/or Tenant B) can be organized into one or more data partitions and stored in at least one data container. Furthermore, each data partition can be stored in one or more of the plurality of computing nodes included in the distributed data storage system 100 including, for example, the first computing node 140A, the second computing node 140B, the third computing node 140C, the fourth computing node 140D, and/or the fifth computing node 140E.

Figure 1B:
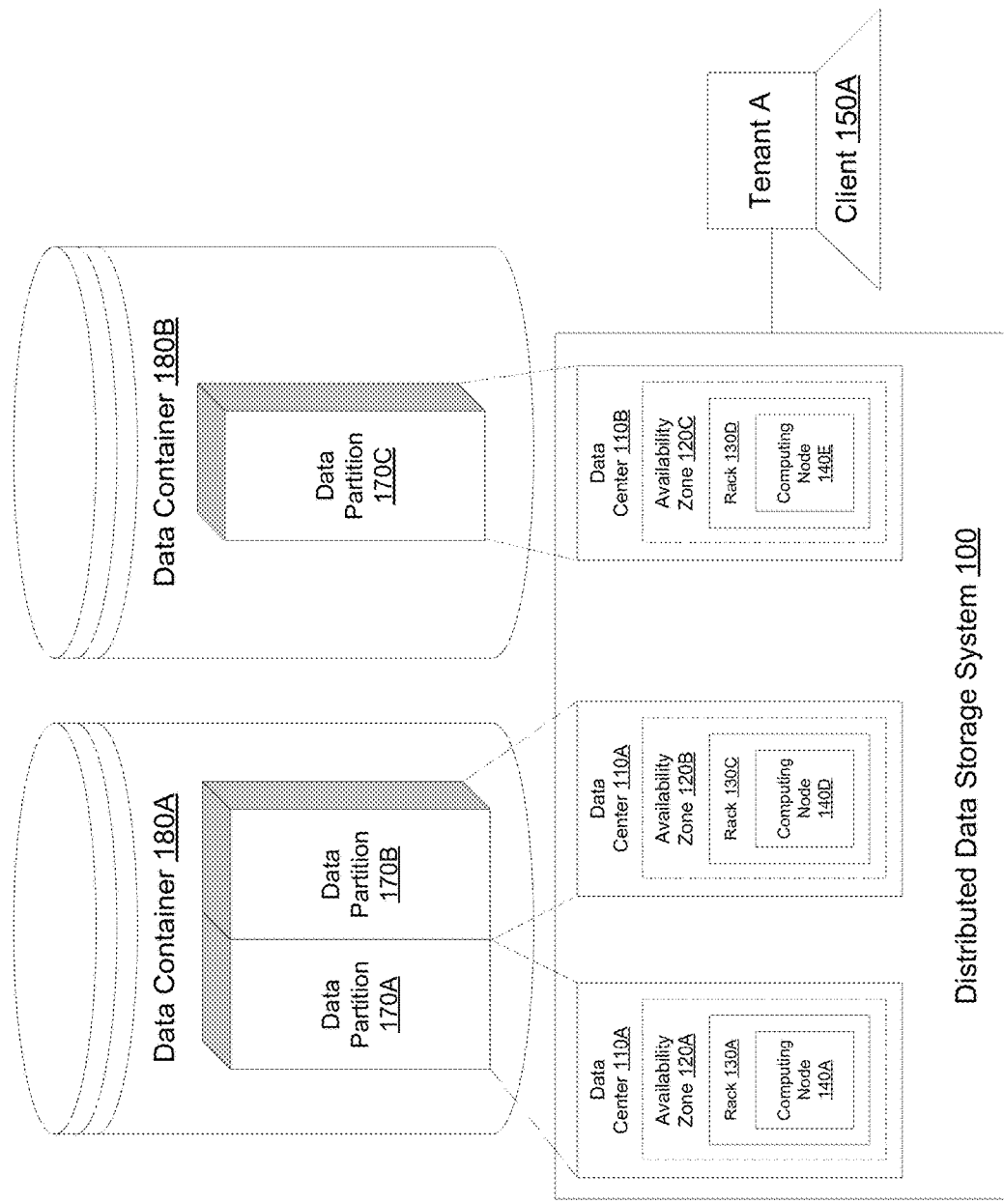
FIG. 1B depicts a block diagram illustrating multitenancy within a distributed data storage system consistent with some implementations of the current subject matter.

To further illustrate, FIG. 1B depicts a block diagram illustrating multitenancy within the distributed data storage system 100 consistent with some implementations of the current subject matter. As shown in FIG. 1B, data associated with Tenant A may be organized into a plurality of data partitions including, for example, a first data partition 170A, a second data partition 170B, and a third data partition 170C. Furthermore, FIG. 1B shows the data associated with Tenant A being stored in a plurality of data containers including, for example, a first data container 180A and a second data container 180B. As shown in FIG. 1B, some data containers may hold a single data partition while other data containers may hold multiple data partitions. For example, the first data container 180A may hold both the first data partition 170A and the second data partition 170B whereas the second data container 180B may hold only the third data partition 170C.

As noted, each data partition can be stored in one or more of the plurality of computing nodes included in the distributed data storage system 100. For instance, as shown in FIGS. 1A-B, the first partition 170A can be stored in the first computing node 140A, which may be located on the first rack 130A in the first availability zone 120A of the first data center 110A. The second partition 170B may be stored in the fourth computing node 140D, which may be located on the third rack 130C in the second availability zone 120B of the first data center 110A. Alternatively and/or additionally, the third partition 170C may be stored in the sixth computing node 140F, which may be located on the fourth rack 130D in the third availability zone 120C of the second data center 110B.

According to some implementations of the current subject matter, the topology of the distributed data storage system 100 can further include objects corresponding to the first data partition 170A, the second data partition 170B, the third data partition 170C, the first data container 180A, and/or the second data container 180B. Where a data container holds multiple data partitions, the topology of the distributed data system 100 can further include an object corresponding to a partition map, which may enumerate the data partitions included in that data container. For example, as FIG. 1B shows, the first data container 180A may hold both the first data partition 170A and the second data partition 170B. As such, the topology of the distributed data storage system 100 can include an object corresponding to a partition map for the first data container 180A. That partition map can include, for example, the identifiers (e.g., partition_id) associated with the first data partition 170A and the second data partition 170B.

It should be appreciated that by having data stored across multiple data centers and/or availability zones, Tenant A may be considered a global tenant. By contrast, a tenant who stores data only in a single data center and/or availability zone may be considered a local tenant. In some implementations of the current subject matter, the home of a tenant can refer to a set of placement rules determining the one or more locations (e.g., data centers, availability zones, and/or the like) storing data associated with the tenant. As such, the home of a tenant can determine whether that tenant is considered a global tenant and/or a local tenant.

In some implementations of the current subject matter, the topology of the distributed data storage system 100 may include an object corresponding to the home of the tenant. This object may include the corresponding placement rules the home of a tenant may include the data containers associated with that tenant. Furthermore, the access control list (ACL) associated with the tenant may also be placed within the home of the tenant. For example, the home of Tenant A may include the first data container 180A and the second data container 180B. Furthermore, the home of Tenant A may also include an access control list (ACL) associated with Tenant A.

In some implementations of the current subject matter, the home of a tenant may be defined by a set of placement rules specifying, for example, replication factors, replica locations, and/or the like. For instance, Tenant A may be associated with a set of placement rules indicating, for example, a quantity of replicas of Tenant A's data that is to be placed at different data centers and/or availability zones within the distributed data storage system 100. The set of placement rules associated with Tenant A may further specify specific placement locations including, for example, racks and/or computing nodes within a data center and/or availability zone for placing the replicas of Tenant A's data.

To further illustrate, the set of placement rules associated with Tenant A can define a fully global home for Tenant A by requiring at least one replica of Tenant A's in one or more data centers (e.g., the first data center 110A and the second data center 110B) and/or availability zones (e.g., the first availability zone 120A, the second availability zone 120B, and the third availability zone 120C). The set of placement rules can also define a home for Tenant A that is local to a data center by requiring a replica of Tenant A's data to be placed in multiple availability zones within one or more data centers (e.g., both the first availability zone 120A and the second availability zone 120B within the first data center 110A). Alternatively and/or additionally, the set of placement rules can define a home for Tenant A that is local to an availability zone by requiring all replicas of Tenant A's data to be placed in a single availability zone (e.g., the first availability zone 120A, the second availability zone 120B, or the third availability zone 120C).

The data containers associated with a tenant may be placed in the home for that tenant which, as noted, may be defined by a set of placement rules. For instance, the first data container 180A and/or the second data container 180B may be placed in the home of Tenant A. In some implementations of the current subject matter, a tenant may have a data container that is placed in a different home than the native home associated with that tenant. Accordingly, a proxy with a link to the data container (e.g., in the different home) may be placed in the tenant's native home. In some implementations of the current subject matter, the topology of the distributed data storage system 100 may include objects corresponding to the homes of one or more tenants such as, for example, Tenant A, Tenant B, and/or the like. The topology of the distributed data storage system 100 may further include objects corresponding to the placement rules defining the homes of the one or more tenants. Alternatively and/or additionally, the topology of the distributed data storage system 100 may include proxy objects linking to the container objects of data containers that reside in a different home than the native homes of the one or more tenants.

Figure 1C:
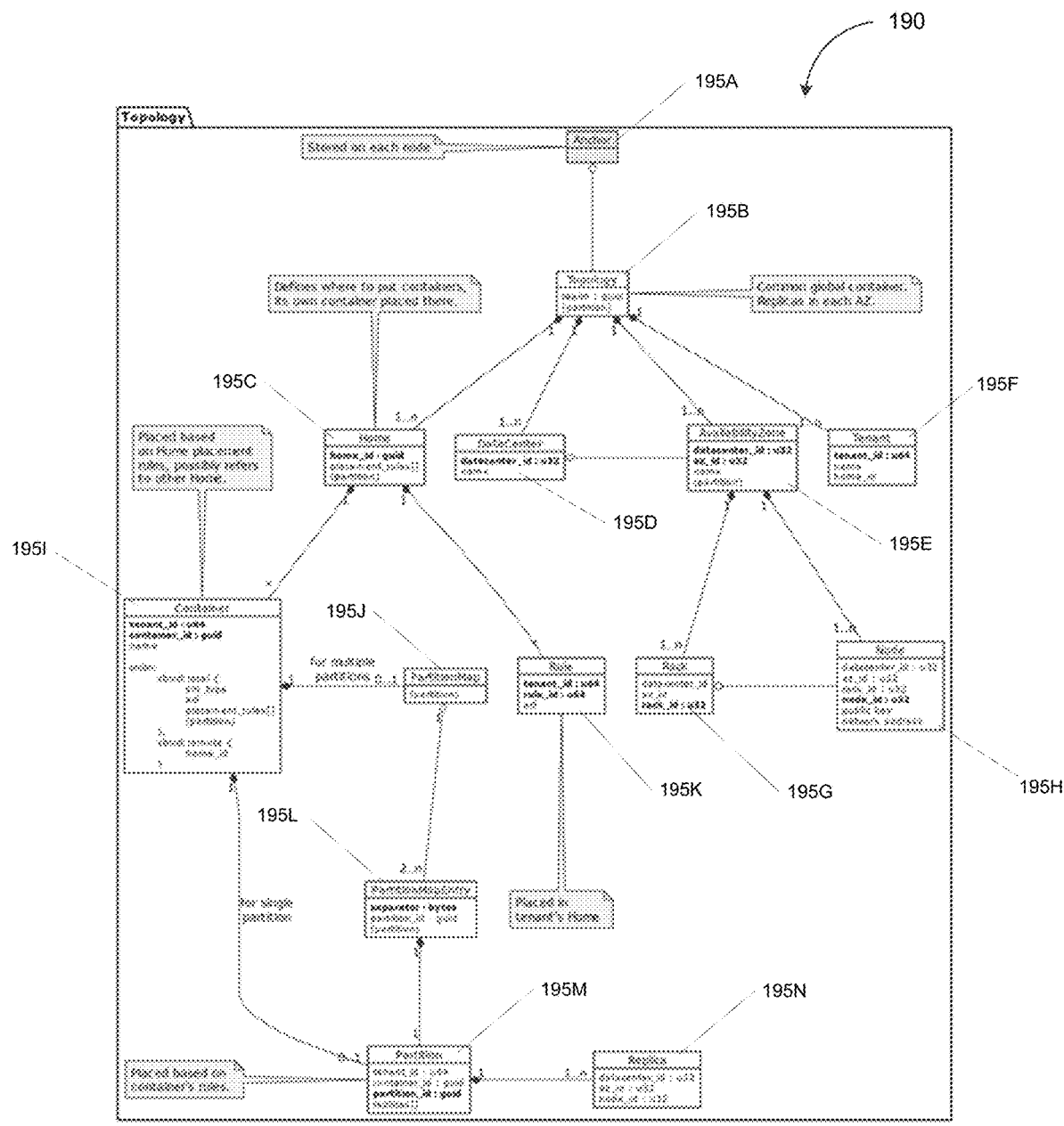
FIG. 1C depicts a topology of a distributed data storage system consistent with some implementations of the current subject matter.

To further illustrate, FIG. 1C depicts a topology 190 of the distributed data storage system 100 consistent with some implementations of the current subject matter. Referring to FIGS. 1A-C, the topology 190 of the distributed data storage system 100 may include a plurality of objects. It should be appreciated that each of the plurality of objects included in the topology 190 may be, for example, metadata objects. According to some implementations of the current subject matter, one or more of the plurality of objects included in the topology 190 may be replicated and cached at different computing nodes across the distributed data storage system 100.

As FIG. 1C shows, the topology 190 may include an anchor object 195A, which may include a link to a topology object 195B. Meanwhile, the topology object 195B may be associated with a set of tenants (e.g., Tenant A and Tenant B). In some implementations of the current subject matter, the topology object 195B may reside within a special data partition within the distributed data storage system 100 and may therefore be assigned a well-known globally unique identifier (GUID) associated with the data container storing the special data partition that contains topology object 195B. The topology object 195B may store a plurality of elements within the distributed data storage system including, for example, the homes, data centers, availability zones, and/or tenants included in the distributed data storage system 100. Furthermore, FIG. 1C shows the topology object 195B as being linked to a set of home objects 195C. The home objects 195C may also reside in the special partition occupied by the topology object 195B and are assigned some globally unique identifier (GUID) to identify individual homes within the distributed data storage system 100. As noted, that globally unique identifier may be associated with the data container storing the special data partition containing both the topology object 195B and the home object 195C.

In some implementations of the current subject matter, the topology object 195B may be further linked to a set of data center objects 195D, a set of availability zone objects 195E, and a set of tenant objects 195F. The data center object 195D may correspond to a data center in the distributed data storage system 100 such as, for example, the first data center 110A or the second data center 110B. As shown in FIG. 1C, the data center object 195D may store an identifier of the corresponding data center (e.g., datacenter_id). Meanwhile, the tenant object 195F mayH correspond to a tenant (e.g., Tenant A and/or Tenant B) associated with the data center corresponding to the data center object 195D, for example, at least by storing data at the data center corresponding to the data center object 195D. For example, the tenant object 195F may store an identifier of the corresponding tenant (e.g., tenant_id).

Furthermore, as shown in FIG. 1C, the data center object 195D may be linked to a set of availability zone objects 195E, which may correspond to multiple availability zones included in the data center corresponding to the data center object 195D. As FIG. 1C shows, the availability zone object 195E may store an identifier of the corresponding availability zone (e.g., az_id) and/or an identifier of the data center that includes the corresponding availability zone (e.g., datacenter_id). For example, if the data center object 195D corresponds to the first data center 110A, then the availability zone object 195E may store the identifier associated with the first availability zone 120A or the second availability zone 120B included in the first data center 110A. Alternatively and/or additionally, the availability zone object 195E may store the identifier associated with the first data center 110A, which includes the first availability zone 120A and the second availability zone 120B.

As shown in FIG. 1C, the availability zone object 195E may further link to a set of rack objects 195G and a set of node objects 195H. The rack object 195G may correspond to a rack within the availability zone 195E whereas the node object 195H may correspond to a computing node within the availability zone 195E. The rack object 195G may store an identifier associated with the corresponding rack (e.g., rack_id) as well as an identifier associated with the data center (e.g., datacenter_id) and/or the availability zone (e.g., az_id) that includes the corresponding rack. Meanwhile, the node object 195H may store an identifier associated with the corresponding computing node (e.g., u32) as well as an identifier associated with the data center (e.g., datacenter_id), the availability zone (e.g., az_id), and/or rack (e.g., rack_id) holding the corresponding computing node. Because a computing node may be part of a rack (e.g., of computing nodes), the rack object 195G may also link to the node object 195H.

To further illustrate, if the availability zone object 195E corresponds to the first availability zone 120A, the rack object 195G may correspond to one of the racks within the first availability zone 120A such as, for example, the first rack 130A or the second rack 130B. Furthermore, if the rack object corresponds to the first rack 130A, the node object 195H may correspond to one of the computing nodes placed on the first rack 130A such as, for example, the first computing node 140A or the second computing node 140B. It should be appreciated that the tenant associated with the tenant object 195F.

Referring again to FIG. 1C, the home object 195C may be linked to a set of container objects 195I and a set of rule objects 195K. The container object 195I may correspond to one of the plurality of data containers associated with the tenant corresponding to the tenant object 195F (e.g., Tenant A and/or Tenant B). For example, the container object 195I may correspond to the first data container 180A or the second data container 180B associated with Tenant A. As such, the container object 195I may store an identifier associated with the first data container 180A or the second data container 180B. Alternatively and/or additionally, the container object 195I may a proxy object linking to the container object (not shown) of a data container that resides in a different home than the native home associated with the tenant corresponding to the tenant object 195F.

In some implementations of the current subject matter, the container object 195I may link directly to a partition object 195M if the data container corresponding to the container object 195I includes only a single partition. For example, if the container object 195I corresponds to the second data container 180B, the container object 195I may link directly to the partition object 195M corresponding to the third data partition 170C, which may be the only data partition included in the second data container 180B.

Alternatively and/or additionally, if the data container corresponding to the container object 195I includes multiple data partitions, the container object 195I may link to a partition map object 195J corresponding to a partition map that enumerates the data partitions included in the data container corresponding to the container object 195I. According to some implementations of the current subject matter, this partition map may include a plurality of partition map entries, each of which corresponding to a data partition in the data container corresponding to the container object 195I. For example, if the container object 195I corresponds to the first data container 180A, the container object 195I may link to the partition map object 195J corresponding to a partition map that enumerates the data partitions included in the first data container 180A such as, for example, the first data partition 170A and the second data partition 170B.

It should be appreciated that each partition map entry can include a separator key for supporting efficient key range lookups on a corresponding container because actual data stored in the container can be partitioned based on separator keys. As such, FIG. 1C shows the partition map object 195J as being linked to a partition map entry object 195L that includes a separator key and an identifier of the corresponding data partition (e.g., partition_id). Furthermore, the partition map entry object 195L may link to a partition object 195M, which may correspond to the data partition associated with the partition map entry object 195L. The partition object 195M may further link to a replica object 195N, which may indicate the location storing the data partition associated with the partition object 195M. For example, as shown in FIG. 1C, the replica object 195N may include an identifier of the data center storing the data partition (e.g., datacenter_id), an identifier of the availability zone storing the data partition (e.g., az_id), and/or an identifier of the computing node storing the data partition (e.g., u32).

According to some implementations of the current subject matter, portions of the topology 190 of the distributed data storage system 100 may be replicated and/or cached across the distributed data storage system 100. For example, the anchor object 195A can be replicated and cached at every computing node within the distributed data storage system 100 including, for example, the first computing node 140A, the second computing node 140B, the third computing node 140C, the fourth computing node 140D, the fifth computing node 140E, and/or the sixth computing node 140F. Meanwhile, the topology object 195B can be replicated and cached at every data center and availability zone in the distributed data storage system 100 including, for example, the first data center 110A, the second data center 110B, the first availability zone 120A, the second availability zone 120B, and/or the third availability zone 120C.

In some implementations of the current subject matter, the availability zone object 195E can be replicated and cached across every rack within the corresponding availability zone. For example, if the availability zone object 195E corresponds to the first availability zone 120A, the availability zone object 195E can be replicated and cached at the first rack 130A and the second rack 130B included in the first availability zone 120A.

In some implementations of the current subject matter, the home object 195C can be replicated and cached across the data centers and/or availability zones spanning the corresponding home. For example, where the home object 195C corresponds to a global home that spans across multiple data centers and/or availability zones, a replica of the home object 195C may be placed in each data center and/or availability zone. Alternatively and/or additionally, multiple replicas of the home object 195C may be cached within a single data center and/or availability zone, both where the home object 195C corresponds to a global home that spans multiple data centers and/or availability zones or a local home that is contained within a single data center and/or availability zone.

In some implementations of the current subject matter, multiple replicas of the container object 195I and the corresponding partition map object 195J can also be cached, for example, across the various computing nodes storing the different data partitions included in the corresponding data container. For example, suppose that the container object 195I corresponds to the first data container 180A. As noted, the first data partition 170A may be stored at the first computing node 140A while the second data partition 170B may be stored at the fourth computing node 140D. As such, the container object 195I as well as the partition map object 195J can be replicated and cached at both the first computing node 140A and the fourth computing node 140D. In doing so, one of the data partitions of the first data container 180A may remain in operation even when the other data partition is offline, for example, due to a failure at the computing node storing the other data partition.

According to some implementations of the current subject matter, each object within the topology 190 may be stored as a key-value pair (KVP). For example, the topology object 195B may be associated with a key and/or a composite key, which may be used to identify and/or locate the topology object 195B. Furthermore, the key and/or the composite key may be associated with a value corresponding to the topology object 195B which, as noted, may include all of the homes, data centers, availability zones, and/or tenants included in the distributed data storage system 100.

In some implementations of the current subject matter, caching multiple replicas of the objects from the topology 190 across the distributed data storage system 100 can eliminate single points of failure. It should be appreciated that each portion of the distributed data storage system 100 can cache a portion of the topology 190 that enables that portion of the distributed data storage system 100 to remain operational when other portions of the distributed data storage system 110 fail. For instance, the first data center 110A can remain operational in the event of a failure at the second data center 110B and/or an inability to communicate with the second data center 110B. Similarly, the first availability zone 120A can remain operational in the event of a failure at the second availability zone 120B and/or an inability to communicate with the second availability zone 120B.

Alternatively and/or additionally, caching multiple replicas of the objects from the topology 190 across the distributed data storage system 100 can enable a reconstruction of the topology 190, for example, in the event of a catastrophic failure across the distributed data storage system 100. For instance, since portions of the topology 190 may be stored redundantly across multiple computing nodes in the distributed data storage system 100, the topology 190 can be rebuilt as a whole by traversing the computing nodes storing the various portions of the topology 190.

It should be appreciated that at least some of the objects included in the topology 190 may be subject to change and/or becoming stale. For example, any object that is associated with a data partition (e.g., the home object 195C, the container object 195I, the partition map object 195J, the rule object 195K, the partition map entry object 195L, the partition object 195M, the replica object 195N, and/or the like) may become stale whenever there is a repartitioning of the data associated with a tenant. As such, in some implementations of the current subject matter, the key-value pair associated with each object within the topology 190 may be associated with a value (e.g., a version counter, a mutation identifier, and/or the like) indicative of whether that key-value pair has become stale due to a change within the distributed data storage system 100. Meanwhile, consistency across the replicas cached across the distributed data storage system 100 may be maintained by a consensus protocol such as, for example, the consensus protocol described in U.S. patent application Ser. No. 15/363,738.

In some implementations of the current subject matter, the topology 190 may be used to locate data required to execute to one or more queries (e.g., structured query language (SQL) statements and/or the like). For example, a first client 150A associated with Tenant A and/or a second client 150B associated with Tenant B may send, via a network 160, a query to the distributed data storage system 100. It should be appreciated that the network 160 can be any wired and/or wireless network including, for example, a public land mobile network (PLMN), a local area network (LAN), a wide area network (WAN), a virtual local area network (VLAN), the Internet, and/or the like.

The query from the first client 150A and/or the second client 150B may be received at the first data center 110A and/or the second data center 110B. Executing the query may require data held in one or more data containers and/or data partitions, which may be stored across multiple computing nodes located in one or more data centers, availability zones, and/or racks within the distributed data storage system 100. As such, according to some implementations of the current subject matter, the topology 190 may be used to locate the data required to execute the query including, for example, data held in a different data center than the data center that originally received the query. For example, the topology 190 may be used to identify a data container, a data partition, and/or a computing node storing the data required to execute to the query from the first client 150A and/or the second client 150B.

Figure 2:
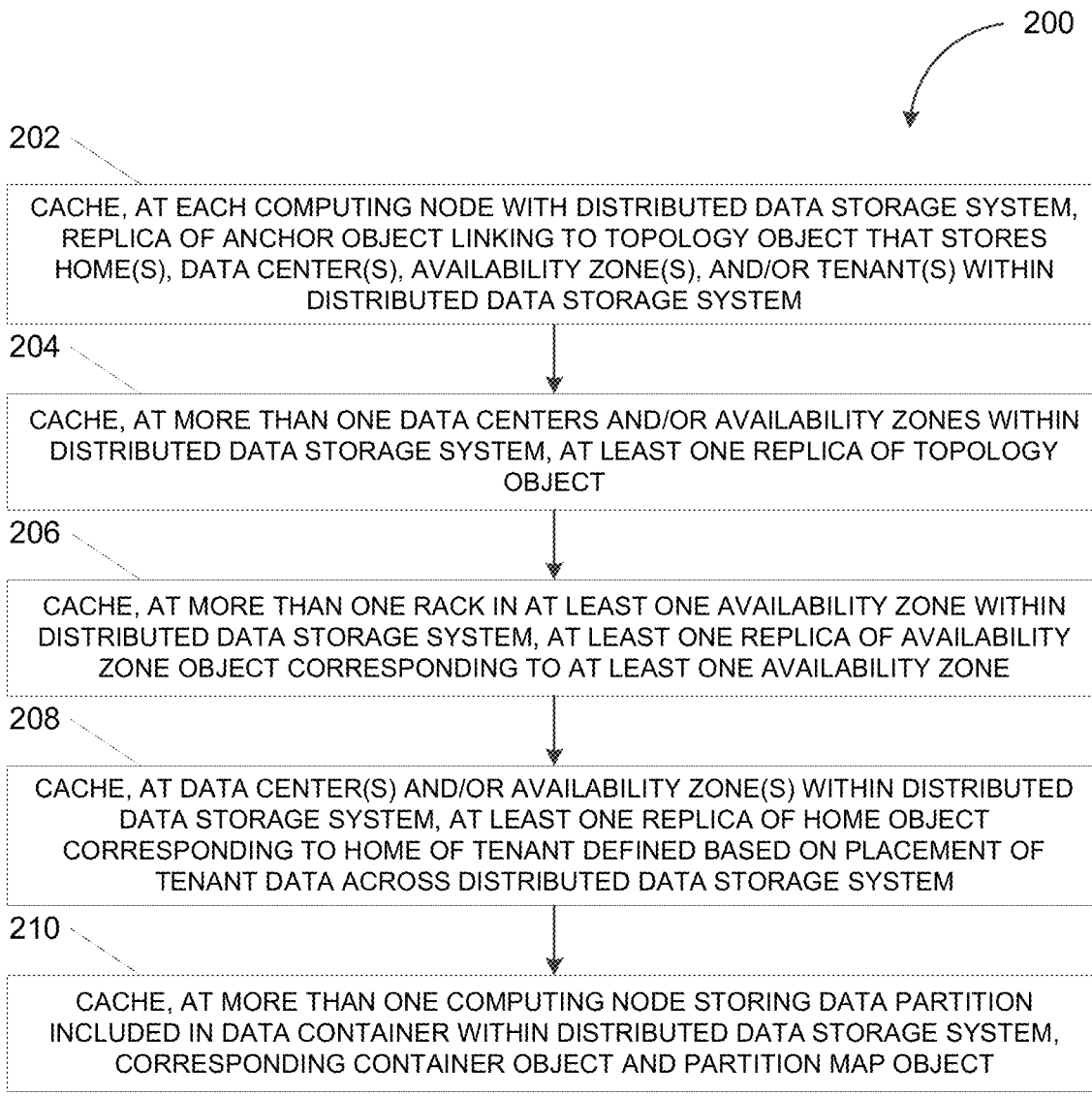
FIG. 2 depicts a flowchart illustrating a process for managing the topology of a distributed data storage system consistent with some implementations of the current subject matter.

FIG. 2 depicts a flowchart illustrating a process 200 for managing the topology of the distributed data storage system 100 consistent with some implementations of the current subject matter. Referring to FIGS. 1A-C and 2, the process 200 may be performed by the distributed data storage system 100.

The distributed data storage system 100 can cache, at each computing node within the distributed data storage system 100, a replica of an anchor object linking to a topology object that stores one or more homes, data centers, availability zones, and/or tenants within the distributed data storage system 100 (202). For example, in some implementations of the current subject matter, the distributed data storage system 100 may replicate and cache the anchor object 195A at the first computing node 140A, the second computing node 140B, the third computing node 140C, the fourth computing node 140D, the fifth computing node 140E, and/or the sixth computing node 140F.

The distributed data storage system 100 can cache, at more than one of the data centers and/or availability zones within the distributed data storage system 100, at least one replica of the topology object (204). For example, in some implementations of the current subject matter, the distributed data storage system 100 may replicate and cache the topology object 195B at the first data center 110A, the second data center 110B, the first availability zone 120A, the second availability zone 120B, and/or the third availability zone 120C. As noted, the topology object 195B may store all of the homes, data centers, availability zones, and/or tenants within the distributed data storage system 100.

The distributed data storage system 100 can cache, at more than one of the racks in at least one availability zone within the distributed data storage system 100, at least one replica of an availability zone object corresponding to the at least one availability zone (206). For example, if the availability zone object 195E corresponds to the first availability zone 120A, the distributed data storage system 100 may replicate and cache the availability zone object 195E at the first rack 130A and the second rack 130B included in the first availability zone 120A. Here, the availability zone object 195E may include an identifier associated with the first data center 110A and/or an identifier associated with the first availability zone 120A.

The distributed data storage system 100 can cache, at one or more data centers and/or availability zones within the distributed data storage system 100, at least one replica of a home object corresponding to a home of a tenant that is defined based on a placement of the tenant's data across the distributed data storage system 100 (208). For example, in some implementations of the current subject matter, at least one replica of the home object 195C may be cached at each data center and/or availability zone included in the home of a tenant. As noted, the home of the tenant can be determined by the placement of that tenant's data, which can be specified by a set of placement rules corresponding to the rule object 195K linked to the home object 195C. Where a tenant's data is placed across multiple data centers and/or availability zones, the tenant may be associated with a global home and at least one replica of the home object 195C may be placed at each of these data centers and/or availability zones. Alternatively and/or additionally, where the tenant's data is placed only in a single data center and/or availability zone, the tenant may be associated with a local home and one or more replicas of the home object 195C may be placed within that single data center and/or availability zone.

The distributed data storage system 100 can cache, at more than one of the computing nodes storing a data partition included in a data container within the distributed data storage system 100, a corresponding container object and partition map object (210). For example, suppose that the container object 195I corresponds to the first data container 180A. The first data partition 170A may be stored at the first computing node 140A while the second data partition 170B may be stored at the fourth computing node 140D. As such, the container object 195I as well as the corresponding partition map object 195J can be replicated and cached at both the first computing node 140A and the fourth computing node 140D. As noted, caching multiple replicas of the container object 195I and the partition map object 195J may preserve the operability of one of the data partitions of the first data container 180A in the event that the other data partition is offline, for example, due to a failure at the computing node storing the other data partition.

Figure 3A:
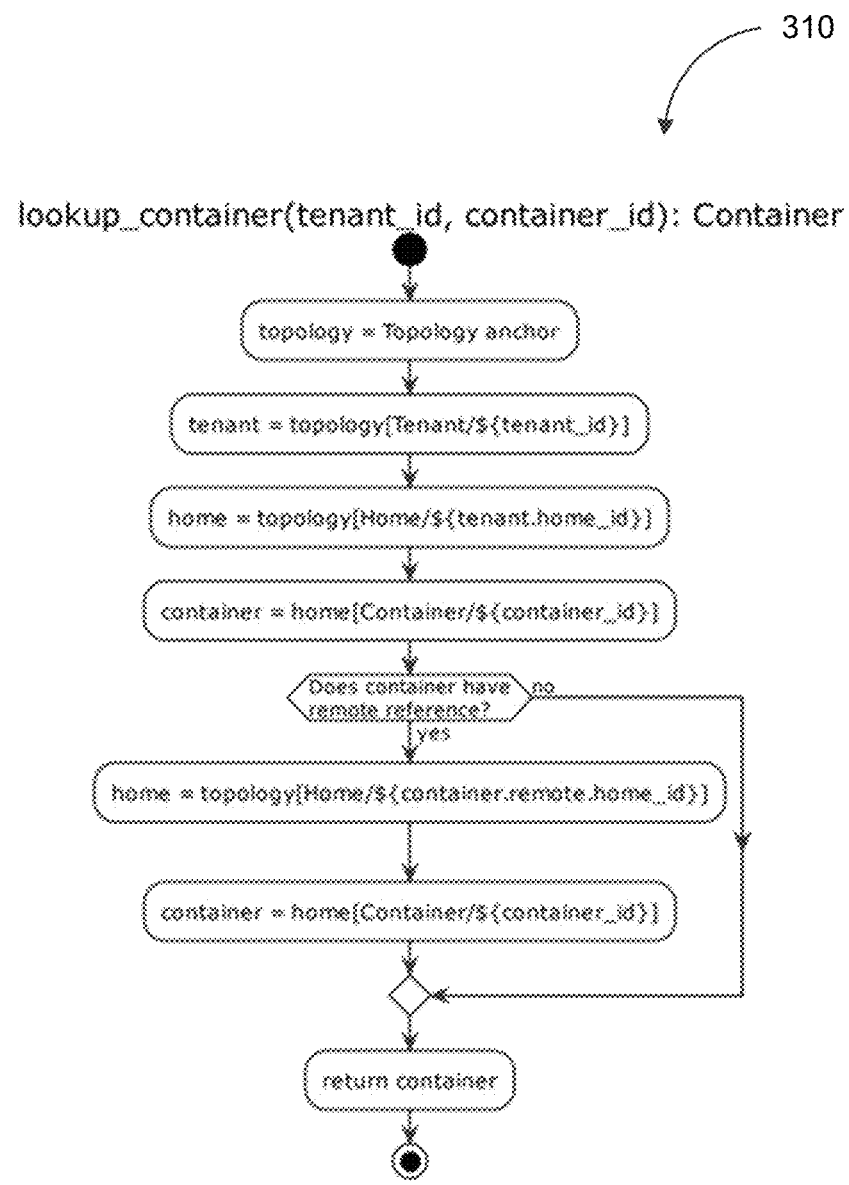
FIG. 3A depicts a flowchart illustrating a process for performing a data container lookup consistent with some implementations of the current subject matter.

FIG. 3A depicts a flowchart illustrating a process 310 for performing a data container lookup consistent with some implementations of the current subject matter. Referring to FIGS. 1A-C and 3A, the process 310 may be performed to locate, within the topology 190, a container object corresponding to data container based on a tenant identifier (e.g., tenant_id) and a container identifier (e.g., container_id). Locating the container object may include traversing, based on the tenant identifier (e.g., tenant_id) and the container identifier (e.g., container_id), the topology 190, for example, from the anchor object 195A to the topology object 195B to the home object 195C and finally to the container object 195I. As noted, the container object 195I may be a proxy object that links to the container object of a data container that resides in a different home than the native home of the tenant having the specified tenant identifier (e.g., tenant_id). As such, the process 310 may include determining whether the container object 195I is a proxy object, in which case the data container may be located by following the link included in the container object 195I to the home in which the data container actually resides. As shown in FIG. 3A, the process 310 may return the data container associated with the specified tenant identifier (e.g., tenant_id) and container identifier (e.g., container_id).

Figure 3B:
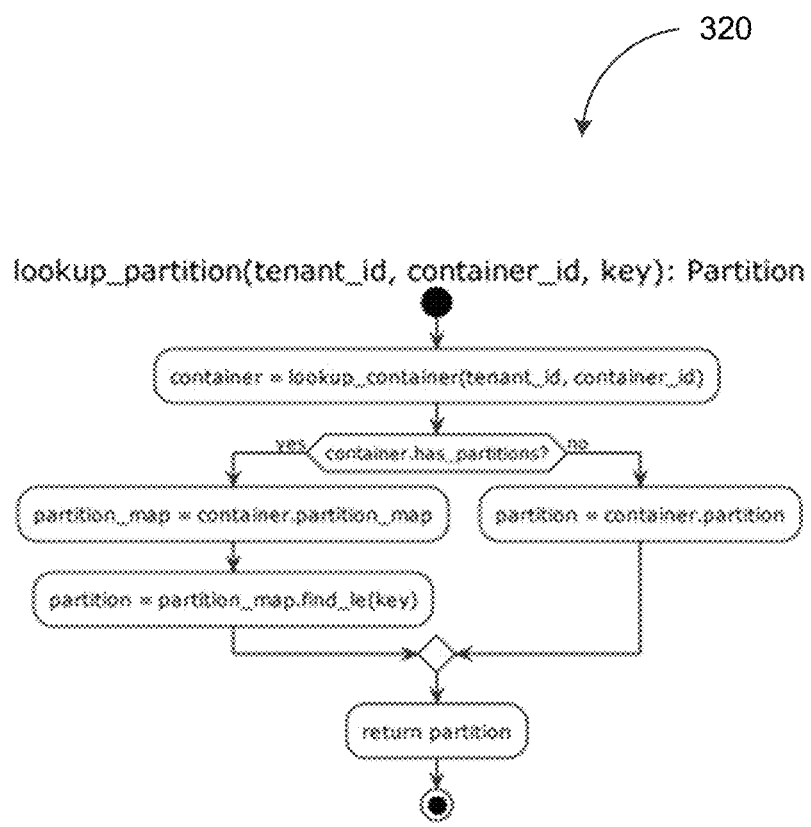
FIG. 3B depicts a flowchart illustrating a process for performing a data partition lookup consistent with implementations of the current subject matter.

FIG. 3B depicts a flowchart illustrating a process 320 for performing a data partition lookup consistent with implementations of the current subject matter. Referring to FIGS. 1A-C and 3B, the process 320 may be performed to locate a partition object corresponding to a data partition based on a tenant identifier (e.g., tenant_id), a container identifier (e.g., container_id), and a key. As shown in FIG. 3B, the process 320 may include locating a container object corresponding to a data container associated with the specified tenant identifier (e.g., tenant_id) and container identifier (e.g., container_id). Here, the process 310 described with respect to FIG. 3A may be performed in order to locate the container object based on the specified tenant identifier (e.g., tenant_id) and container identifier (e.g., container_id).

As noted, in some implementations of the current subject matter, the partition map for a data container that includes multiple data partitions can include a plurality of entries, each of which corresponding to one of the data partitions included in the data container. Moreover, each entry in the partition map can include a partition identifier and a corresponding separator key. The separator keys can be used to separate adjacent entries within the partition map. Furthermore, it should be appreciated that the entries in the partition map may be sorted based on separator keys instead of and/or in addition to partition identifiers.

According to some implementations of the current subject matter, the process 320 can include determining whether the data container associated with the specified container identifier (e.g., container_id) includes multiple data partitions. Where the data container has only a single data partition (e.g., the second data container 180B), the process 320 may return that single data partition (e.g., the third data partition 170C) included in the data container. Alternatively and/or additionally, where the data container includes multiple data partitions (e.g., the first data container 180A), the process 320 may include locating the partition map object (e.g., the partition map object 195C) associated with the data container. Furthermore, the process 320 may include locating a partition map entry object (e.g., the partition map entry object 195L) having the specified key. As noted, entries in the partition map may be sorted based on the key associated with each entry. Accordingly, the partition map entry object having the specified key can be located by at least comparing the specified key to successive keys in the partition map (e.g., by applying a less-than-or-equal to operator). The partition map entry object may link to a partition object (e.g., the partition object 195M). As such, in some implementations of the current subject matter, the process 320 may return the data partition corresponding to that partition object.

Figure 3C:
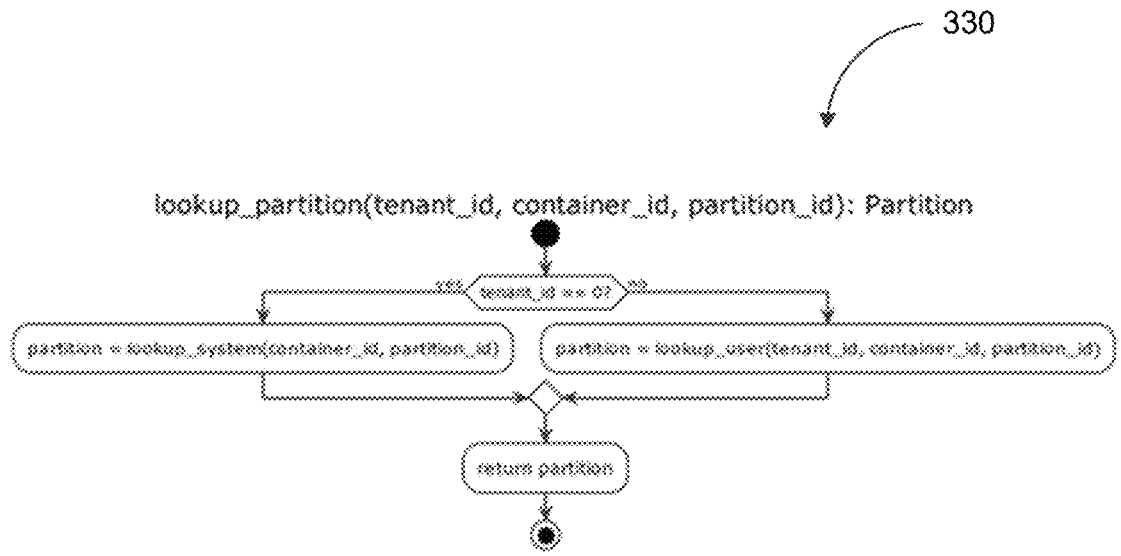
FIG. 3C depicts a flowchart illustrating a process for performing a data partition lookup consistent with implementations of the current subject matter.

FIG. 3C depicts a flowchart illustrating a process 330 for performing a data partition lookup consistent with implementations of the current subject matter. Referring to FIGS. 1A-C and 3C, the process 330 may be performed to locate a partition object corresponding to a data partition based on a tenant identifier (e.g., tenant_id), a container identifier (e.g., container_id), and a partition identifier (e.g., partition_id). As FIG. 3C shows, the process 330 may return a partition corresponding to the partition object having the specified tenant identifier (e.g., tenant_id), container identifier (e.g., container_id), and a partition identifier (e.g., partition_id).

In some implementations of the current subject matter, a data partition having a specified partition identifier can be located by performing either a system lookup (e.g., for a system tenant) and/or a user lookup (e.g., for a user tenant). It should be appreciated that the tenants within the distributed data storage system 100 may share at least some data, which may be stored in special system data partitions accessible to all tenants of the distributed data storage system 100 (e.g., both Tenant A and Tenant B). These system partitions may be associated with a system tenant instead of a specific tenant. Moreover, these system data partitions can include, for example, the anchor object 195A, the topology object 195B, the home object 19C, the data center object 195D, and/or the availability zone object 195E, which may be visible to all tenants within the distributed data storage system 100.

Accordingly, in some implementations of the current subject matter, the process 330 may include determining whether the tenant having the specified tenant identifier (e.g., tenant_id) is a system tenant or a user tenant. According to some implementations of the current subject matter, system tenants and user tenants can be differentiated based on tenant identifiers. For instance, the tenant identifier (e.g., tenant_id) assigned to a system tenant can have a certain value (e.g., "0") that is different from the tenant identifiers assigned to user tenants. If the specified tenant identifier (e.g., tenant_id) corresponds to a system tenant, then the process 330 can include performing a system lookup to locate a partition object based on the specified container identifier (e.g., container_id) and partition identifier (e.g., partition_id) but not the specified tenant identifier (e.g., tenant_id) because, as noted, system partitions are not associated with any specific tenant. Alternatively and/or additionally, if the specified tenant identifier (e.g., tenant_id) corresponds to a user tenant, then the process 330 can include performing a user lookup to locate the partition object based on the specified container identifier (e.g., container_id), partition identifier (e.g., partition_id), and tenant identifier (e.g., tenant_id). Here, the specified tenant identifier can be used to locate the portions of the topology 190 that are associated with the tenant associated with that tenant identifier.

Figure 3D:
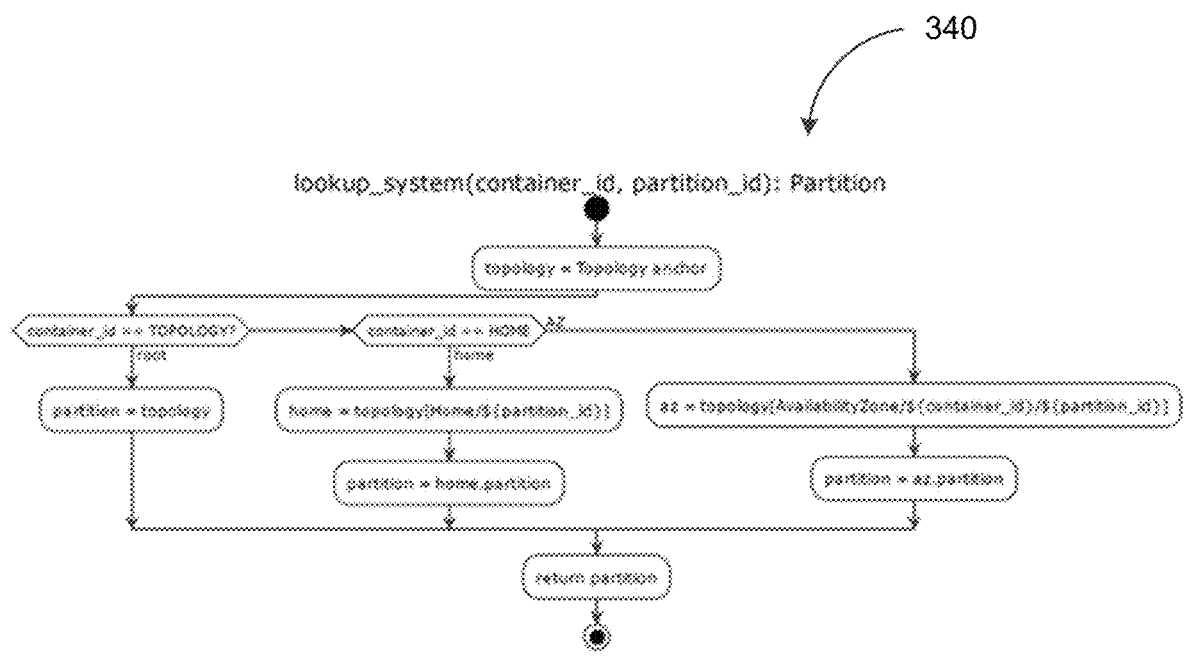
FIG. 3D depicts a flowchart illustrating a process for performing a data partition lookup consistent with implementations of the current subject matter.

FIG. 3D depicts a flowchart illustrating a process 340 for performing a system lookup consistent with implementations of the current subject matter. Referring to FIGS. 1A-C and 3C-D, the process 340 may be performed in order to locate, based on a container identifier (e.g., container_id) and a partition identifier (e.g., partition_id), a system data partition that stores data shared amongst all of the tenants within the distributed data storage system 100. As noted, a system partition can be associated with a system tenant instead of any specific tenant within the distributed data storage system 100. Furthermore, system partitions and the data containers holding the system partitions can be assigned special well-known container identifiers (e.g., container_id) such as, for example, a globally unique identifier (GUID), that differentiate the these data partitions and/or data containers from those belonging to specific tenants (e.g., Tenant A or Tenant B) of the distributed data storage system 100. In some implementations of the current subject matter, the process 340 can return a system data partition associated with the specified container identifier (e.g., container_id) and partition identifier (e.g., partition_id).

Referring again to FIG. 3D, the process 340 may include locating a container object associated with a data container having the specified container identifier (e.g., container_id). Furthermore, the process 340 may include locating, within the data container having the specified container identifier (e.g., container_id), a partition object associated with a system data partition having the specified partition identifier (e.g., partition_id). As noted, system data containers and data partitions may be assigned special identifiers (e.g., globally unique identifier (GUID)). Thus, the process 340 may include comparing the specified container identifier and/or partition identifier to the identifiers associated with one or more system data containers and/or system data partitions. For example, the topology object 195B may be stored in a system data partition with the partition identifier "topology," which may be held in a data container having the container identifier "TOPOLOGY." The home object 195C may be stored in a system data partition with the identifier "home.partition," which may be held in a data container having the container identifier "HOME." Alternatively and/or additionally, the availability zone object 195E may be stored in a system data partition with the identifier "az.partition," which may be held in a data container having the container identifier "AZ."

Figure 3E:
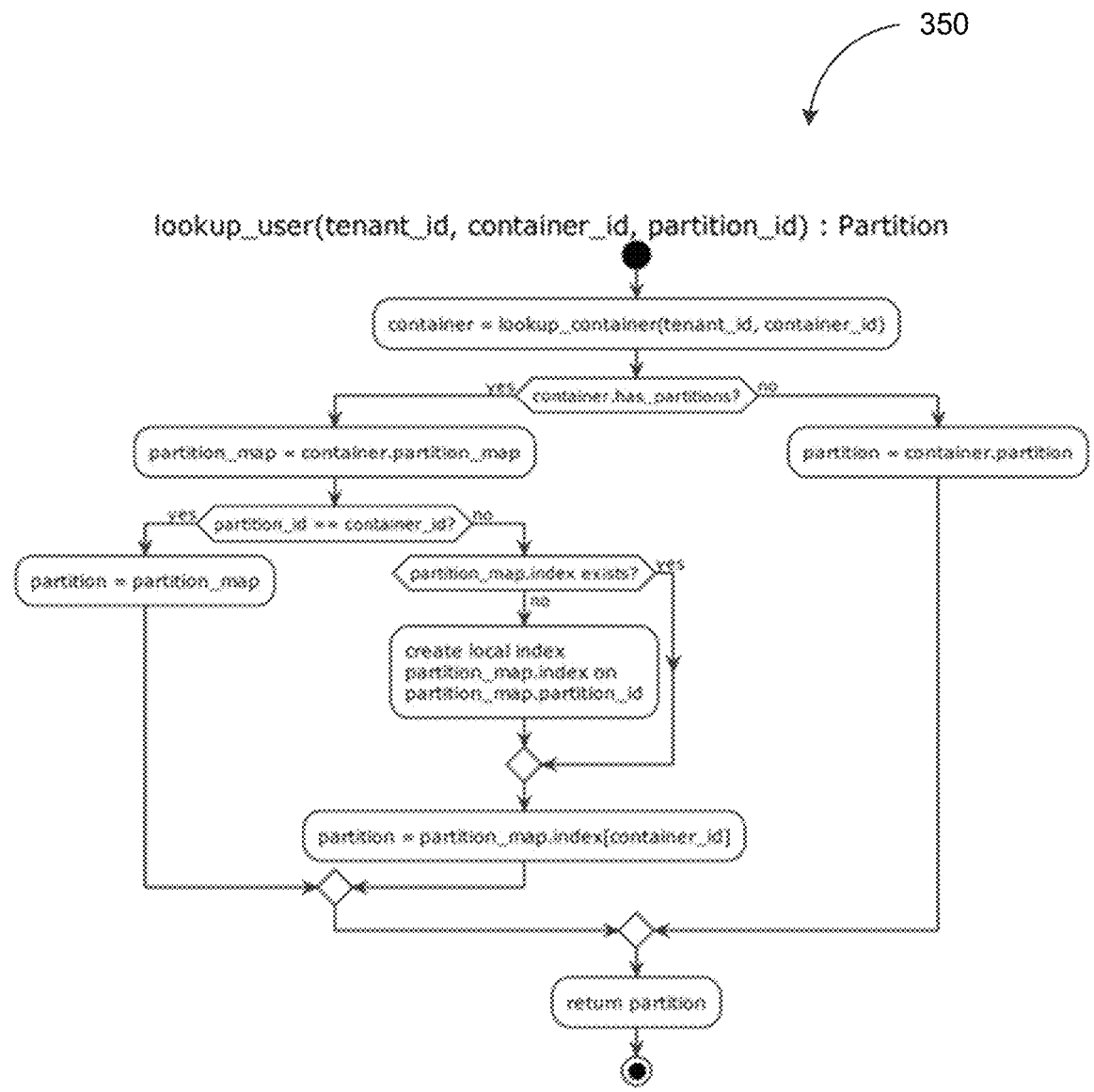
FIG. 3E depicts a flowchart illustrating a process for performing a data partition lookup consistent with implementations of the current subject matter.

FIG. 3E depicts a flowchart illustrating a process 350 for performing a user lookup consistent with implementations of the current subject matter. Referring to FIGS. 1A-C, 3C, and 3E, the process 350 may be performed in order to locate, based on a container identifier (e.g., container_id) and a partition identifier (e.g., partition_id), a data partition storing data belonging to a tenant having a specific tenant identifier (e.g., tenant_id). In some implementations of the current subject matter, the process 350 can return a data partition associated with the specified container identifier (e.g., container_id), partition identifier (e.g., partition_id), and tenant identifier (e.g., tenant_id).

As noted, a data container can include one or more data partitions. As such, the process 350 can include determining whether the data container associated with the specified container identifier (e.g., container_id) includes multiple data partitions. Where the data container has only a single data partition (e.g., the second data container 180B), the process 350 may return that single data partition (e.g., the third data partition 170C) included in the data container. Alternatively and/or additionally, where the data container includes multiple data partitions (e.g., the first data container 180A), the process 350 may include locating the partition map object (e.g., the partition map object 195C) associated with the data container. Furthermore, the process 350 may include locating a partition map entry object (e.g., the partition map entry object 195L) having the specified key. Entries in the partition map may be sorted based on the key associated with each entry but not the partition identifier (e.g., partition_id) associated with each entry. Thus, the partition map entry object having the specified partition identifier (e.g., partition_id) can be located by performing a full scan of the partition map and/or creating an inverse mapping (e.g., an index).

Figure 4:
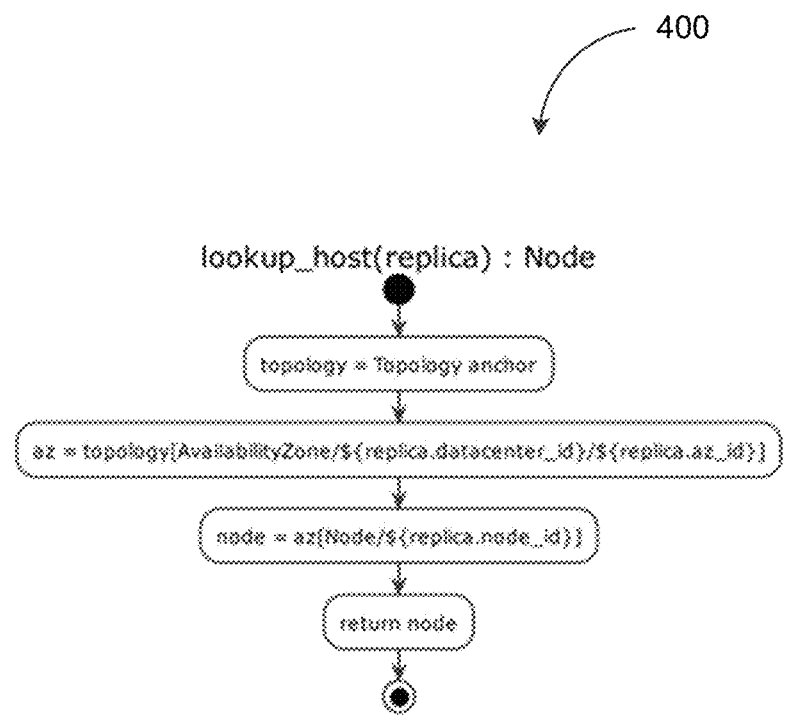
FIG. 4 depicts a flowchart illustrating a process for performing a node lookup consistent with implementations of the current subject matter.

FIG. 4 depicts a flowchart illustrating a process 400 for performing a node lookup consistent with implementations of the current subject matter. Referring to FIGS. 1A-C and 4, the process 400 can be performed to locate a computing node within the distributed data storage system 100 based on a replica object. As shown in FIG. 1C, a replica object such as, for example, the replica object 195N may include a data center identifier (e.g., datacenter_id), an availability zone identifier (e.g., az_id), and a computing node identifier (e.g., node_id) of where a replica of a corresponding data partition is stored. Accordingly, in some implementations of the current subject matter, the process 400 may include traversing the topology 190 based on the data center identifier (e.g., datacenter_id), the availability zone identifier (e.g., az_id), and the computing node identifier (e.g., node_id) included in the replica object 195N.

For instance, the process 400 may include locating the topology object 195B based on the link from the anchor object 195A. The process 400 may further include locating the availability zone object 195E based on the data center identifier (e.g., datacenter_id) and availability zone identifier (e.g., az_id) included in the replica object 195N. Furthermore, the process 400 may include locating the node object 195H based on the node identifier (e.g., node_id) included in the replica object 195N and by following the link from the availability zone object 195E. As shown in FIG. 4, the process 400 may return the node object 195H corresponding to replica object 195N. For instance, in some implementations of the current subject matter, the node object 195H may correspond to a computing node at which the data partition corresponding to the replica object 195N is stored.

Figure 5:
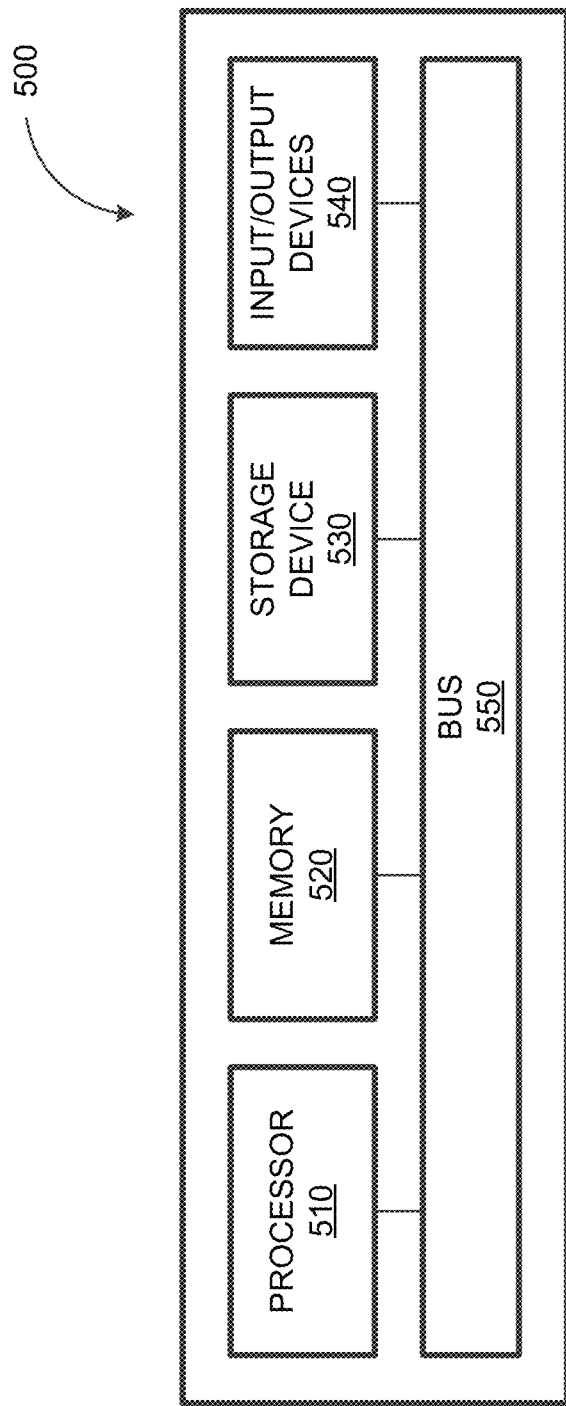
FIG. 5 depicts a block diagram illustrating a computing system consistent with some implementations of the current subject matter.

FIG. 5 depicts a block diagram illustrating a computing system 500 consistent with implementations of the current subject matter. Referring to FIGS. 1 and 5, the computing system 500 can be used to implement the distributed data storage system 100 and/or any components therein.

As shown in FIG. 5, the computing system 500 can include a processor 510, a memory 520, a storage device 530, and input/output devices 540. The processor 510, the memory 520, the storage device 530, and the input/output devices 540 can be interconnected via a system bus 550. The processor 510 is capable of processing instructions for execution within the computing system 500. Such executed instructions can implement one or more components of, for example, the distributed data storage system 100. In some example embodiments, the processor 510 can be a single-threaded processor. Alternately, the processor 510 can be a multi-threaded processor. The processor 510 is capable of processing instructions stored in the memory 520 and/or on the storage device 530 to display graphical information for a user interface provided via the input/output device 540.

The memory 520 is a computer readable medium such as volatile or non-volatile that stores information within the computing system 500. The memory 520 can store data structures representing configuration object databases, for example. The storage device 530 is capable of providing persistent storage for the computing system 500. The storage device 530 can be a solid state drive, a floppy disk device, a hard disk device, an optical disk device, or a tape device, or other suitable persistent storage means. The input/output device 540 provides input/output operations for the computing system 500. In some example embodiments, the input/output device 540 includes a keyboard and/or pointing device. In various implementations, the input/output device 540 includes a display unit for displaying graphical user interfaces.

According to some example embodiments, the input/output device 540 can provide input/output operations for a network device. For example, the input/output device 540 can include Ethernet ports or other networking ports to communicate with one or more wired and/or wireless networks (e.g., a local area network (LAN), a wide area network (WAN), the Internet).

In some example embodiments, the computing system 500 can be used to execute various interactive computer software applications that can be used for organization, analysis and/or storage of data in various formats. Alternatively, the computing system 500 can be used to execute any type of software applications. These applications can be used to perform various functionalities, e.g., planning functionalities (e.g., generating, managing, editing of spreadsheet documents, word processing documents, and/or any other objects, etc.), computing functionalities, communications functionalities, etc. The applications can include various add-in functionalities (e.g., SAP Integrated Business Planning as an add-in for a spreadsheet and/or other type of program) or can be standalone computing products and/or functionalities. Upon activation within the applications, the functionalities can be used to generate the user interface provided via the input/output device 540. The user interface can be generated and presented to a user by the computing system 500 (e.g., on a computer screen monitor, etc.).

One or more aspects or features of the subject matter described herein can be realized in digital electronic circuitry, integrated circuitry, specially designed ASICs, field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example, as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive track pads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A distributed data storage system, comprising:
at least one data processor; and
at least one memory storing instructions which, when executed by the at least one data processor, cause operations comprising:
caching, at each of a first computing node and a second computing node, a replica of an anchor object, the anchor object linking to a topology object storing a plurality of elements comprising a topology of the distributed data storage system, the first computing node residing in a first availability zone, the second computing node residing in a second availability zone, the first availability zone and the second availability zone comprising at least a first data center, the first computing node and the second computing node each storing a data partition associated with at least one data container belonging to a first tenant of the distributed data storage system;
caching, at each of the first availability zone and the second availability zone, at least one replica of the topology object; and
executing a query requiring data associated with the first tenant, the execution of the query comprising by at least identifying, based at least on a cached replica of the anchor object and/or the topology object, the first computing node and/or the second computing node as having the data required by the query.

2. The system of claim 1, wherein the first availability zone comprises the first data center, and wherein the second availability zone comprises a second data center.

3. The system of claim 2, further comprising:
caching, at a first rack and a second rack comprising the first availability zone, at least one replica of a first availability zone object corresponding to the first availability zone, the first availability zone object storing a first identifier of the first data center and a second identifier of the first availability zone.

4. The system of claim 3, further comprising:
caching, at the first data center, the second data center, the first availability zone, and/or the second availability zone, at least one replica of a home object corresponding to a home of the first tenant, the home of the first tenant being defined based at least on a placement of the data associated with the first tenant across the distributed data storage system.

5. The system of claim 4, further comprising:
caching, at each of the first computing node and the second computing node, a container object corresponding to the data container and a partition map object corresponding to a partition map associated with the data container, the partition map including a plurality of entries corresponding to a plurality of data partitions included in the data container; and
executing the query by at least identifying, based at least on the container object and the partition map object, a partition map entry object corresponding to one of the plurality of data partition holding the data required by the query, each of the plurality of entries including a key and a partition identifier associated with one of the plurality of data partitions included in the data container.

6. The system of claim 5, wherein the execution of the query further comprises locating the container object based at least on an identifier of the first tenant and an identifier of the data container, wherein the container object is located by at least traversing the topology of the distributed data storage system, and wherein the traversal of the topology of the distributed data storage system includes traversing from the anchor object to the topology object and to the home object in order to reach the container object.

7. The system of claim 6, wherein the execution of the query further comprises locating a partition object corresponding to the one of the plurality of partitions holding the data required by the query, wherein the partition object is located by further traversing the topology of the distributed data storage system from the container object to the partition map object and to the partition map entry object corresponding to one of the plurality of entries included in the partition map, wherein the partition map entry object links to the partition object, and wherein the partition object is located based at least on a key and a partition identifier associated with the one of the plurality of data partitions.

8. The system of claim 7, wherein the plurality of elements include the home of the first tenant, the first tenant, the first availability zone, the second availability zone, the first data center, the data container, the partition map, the plurality of entries, and/or the plurality of data partitions.

9. The system of claim 1, wherein the topology object includes data shared by the first tenant and a second tenant in the distributed data storage system, and wherein the topology object is stored in a system data partition and/or a system data container that is associated with a system tenant instead of the first tenant or the second tenant.

10. The system of claim 1, further comprising:
responding to a failure at a third computing node comprising the distributed data storage system, reconstructing the topology of the distributed data storage system by traversing at least the first computing node in the first availability zone and/or the second computing node in the second availability zone to retrieve the replica of the anchor object and/or the at least one replica of the topology object.

11. A computer-implemented method, comprising:
caching, at each of a first computing node and a second computing node, a replica of an anchor object, the anchor object linking to a topology object storing a plurality of elements comprising a topology of the distributed data storage system, the first computing node residing in a first availability zone, the second computing node residing in a second availability zone, the first availability zone and the second availability zone comprising at least a first data center, the first computing node and the second computing node each storing a data partition associated with at least one data container belonging to a first tenant of the distributed data storage system;
caching, at each of the first availability zone and the second availability zone, at least one replica of the topology object; and executing a query requiring data associated with the first tenant, the execution of the query comprising by at least identifying, based at least on a cached replica of the anchor object and/or the topology object, the first computing node and/or the second computing node as having the data required by the query.

12. The method of claim 11, wherein the first availability zone comprises the first data center, and wherein the second availability zone comprises a second data center.

13. The method of claim 12, further comprising:
caching, at a first rack and a second rack comprising the first availability zone, at least one replica of a first availability zone object corresponding to the first availability zone, the first availability zone object storing a first identifier of the first data center and a second identifier of the first availability zone.

14. The method of claim 13, further comprising:
caching, at the first data center, the second data center, the first availability zone, and/or the second availability zone, at least one replica of a home object corresponding to a home of the first tenant, the home of the first tenant being defined based at least on a placement of the data associated with the first tenant across the distributed data storage system.

15. The method of claim 14, further comprising:
caching, at each of the first computing node and the second computing node, a container object corresponding to the data container and a partition map object corresponding to a partition map associated with the data container, the partition map including a plurality of entries corresponding to a plurality of data partitions included in the data container; and
executing the query by at least identifying, based at least on the container object and the partition map object, a partition map entry object corresponding to one of the plurality of data partition holding the data required by the query, each of the plurality of entries including a key and a partition identifier associated with one of the plurality of data partitions included in the data container.

16. The method of claim 15, wherein the execution of the query further comprises locating a partition object corresponding to the one of the plurality of partitions holding the data required by the query, wherein the partition object is located by further traversing the topology of the distributed data storage system from the container object to the partition map object and to the partition map entry object corresponding to one of the plurality of entries included in the partition map, wherein the partition map entry object links to the partition object, and wherein the partition object is located based at least on a key and a partition identifier associated with the one of the plurality of data partitions.

17. The method of claim 16, wherein the execution of the query further comprises locating a partition object by further traversing the topology of the distributed data storage system from the container object to the partition map object and to a partition map entry object, wherein the partition map entry object links to the partition object corresponding to one of the plurality of data partitions holding the data required by the query, and wherein the partition object is located based at least on a key and a partition identifier associated with the one of the plurality of data partitions.

18. The method of claim 17, wherein the plurality of elements include the home of the first tenant, the first tenant, the first availability zone, the second availability zone, the first data center, the data container, the partition map, the plurality of entries, and/or the plurality of data partitions.

19. The method of claim 11, further comprising:
reconstructing the topology of the distributed data storage system by at least traversing the first computing node in the first availability zone and/or the second computing node in the second availability zone to retrieve the replica of the anchor object and/or the at least one replica of the topology object.

20. A non-transitory computer readable medium storing instructions, which when executed by at least one data processor, cause operations comprising:
caching, at each of a first computing node and a second computing node, a replica of an anchor object, the anchor object linking to a topology object storing a plurality of elements comprising a topology of the distributed data storage system, the first computing node residing in a first availability zone, the second computing node residing in a second availability zone, the first availability zone and the second availability zone comprising at least a first data center, the first computing node and the second computing node each storing a data partition associated with at least one data container belonging to a first tenant of the distributed data storage system;
caching, at each of the first availability zone and the second availability zone, at least one replica of the topology object; and
executing a query requiring data associated with the first tenant, the execution of the query comprising by at least identifying, based at least on a cached replica of the anchor object and/or the topology object, the first computing node and/or the second computing node as having the data required by the query.

* * * * *